United States Patent [19]

Albert et al.

[11] 4,436,991

[45] Mar. 13, 1984

[54] BADGE READER USING INFRARED LIGHT

[75] Inventors: Gordon H. Albert, Larchmont; Harvey M. Feinman, Bronx, both of N.Y.

[73] Assignee: Sealectro Corporation, Mamaroneck, N.Y.

[21] Appl. No.: 356,789

[22] Filed: Mar. 10, 1982

[51] Int. Cl.³ ............................................. G06K 7/10
[52] U.S. Cl. .................................. 235/468; 235/474; 235/458
[58] Field of Search ...................... 235/468, 47.4, 45.8

[56] References Cited

U.S. PATENT DOCUMENTS

| | | | |
|---|---|---|---|
| Re. 28,081 | 7/1974 | Travioli | 235/468 |
| 3,582,623 | 6/1971 | Rothery | 235/468 |
| 3,976,856 | 8/1976 | Ramage | 235/474 |
| 4,055,747 | 10/1977 | Jensen | 235/474 |
| 4,063,070 | 12/1977 | Delarue | 235/474 |
| 4,114,028 | 9/1978 | Baio | 235/474 |
| 4,217,487 | 8/1980 | Kjeer | 235/468 |

Primary Examiner—Harold I. Pitts
Attorney, Agent, or Firm—Anthony J. Casella; Gerald E. Hespos

[57] ABSTRACT

A badge reader which uses infrared light employs circuitry for determining whether portions of the identification badge are relatively opaque or transparent to infrared radiation upon insertion of the badge into the badge reader. The circuitry includes a source of infrared radiation, such as an infrared emitting diode, a detector of infrared radiation such as a phototransistor, an alignment device for detecting the alignment of the opaque or transparent portions of the badge with the source and detector and for producing an alignment signal. The alignment signal is delivered to an infrared emitting diode driver for driving the diode to produce a pulse of infrared radiation in response to the alignment signal. The detector detects a sufficient amount of infrared radiation only when that portion of the card is relatively transparent, and produces an output in response thereto.

8 Claims, 13 Drawing Figures

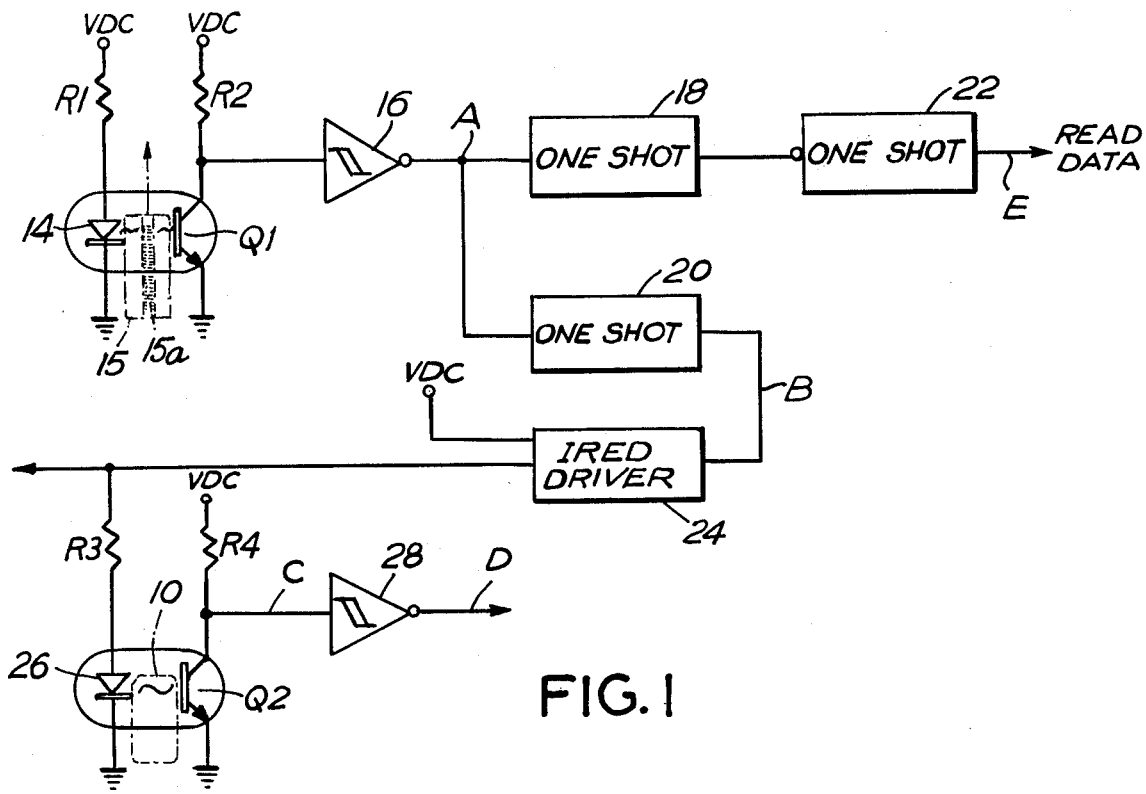
FIG. 1
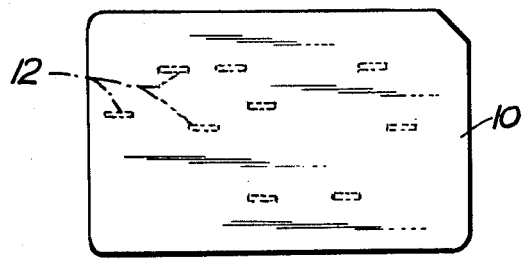
FIG. 2
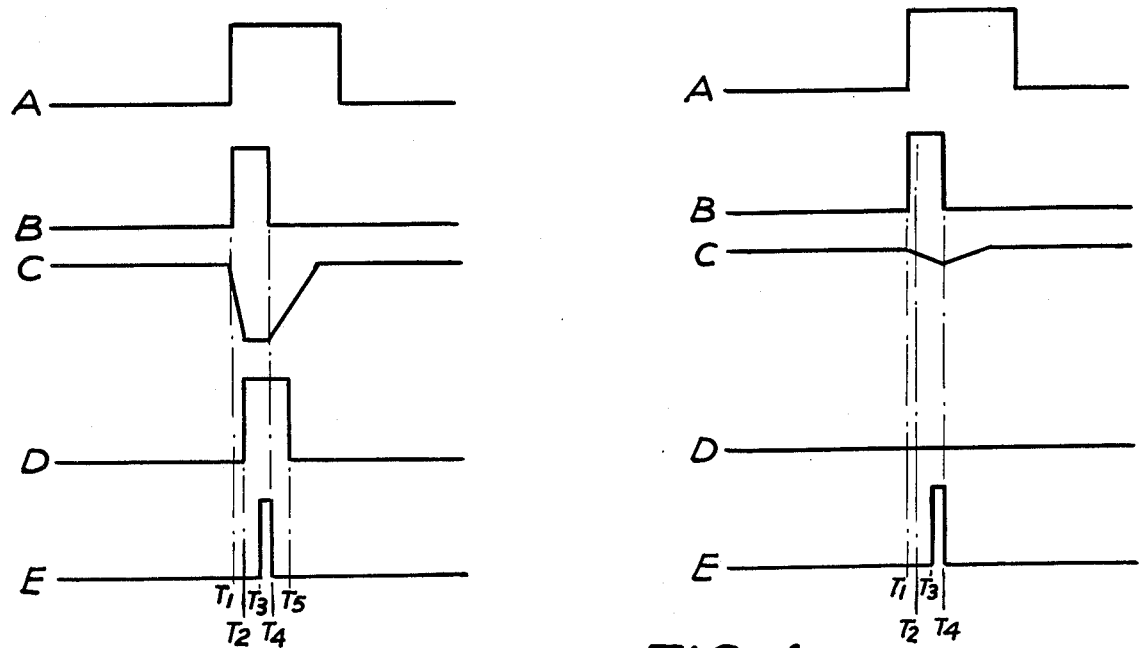
FIG. 3
FIG. 4

BADGE READER USING INFRARED LIGHT

BACKGROUND OF THE INVENTION

The present invention is directed to an optical badge reader similar to that described in U.S. Pat. No. 4,114,028 to Baio et al., and assigned to the assignee of the present invention.

In the above-mentioned patent, an optical badge reader is provided with a strobe generator which is pushed by a badge as it is inserted into the badge reader. The strobe generator is provided with a plurality of spaced slots and is disposed between a light source and a light sensor such that the slots cause the light sensor to generate strobe signals for reading each column of data on the optical badge as it is inserted into the reader.

The badge utilized in the above-mentioned patent is provided with a plurality of data slots arranged in rows and columns which provide the identification data. Light sources are aligned with the rows of slots on the badge and provide a light beam to a light detector through the associated slot in the badge to thereby indicate the presence of such slot to downstream processing electronics.

While such optical badge reading devices are satisfactory for most applications, for other applications additional security measures may be required. Specifically, the punched code on the badges is discernible from a visible inspection, and therefore reproducable by unauthorized persons.

SUMMARY OF THE INVENTION

It is therefore an object of the present invention to provide an optical badge reader which avoids the shortcomings associated with the prior art badge readers.

It is a further object of the present invention to provide an optical badge reader which extracts identification data from a badge which contains an invisible code which is not ascertainable by visual inspection.

It is a further object of the present invention to provide an infrared detection technique which utilizes a plurality of pulses infrared light emitting diodes which are switched on synchronously with the passage of the rows of data into the card reader.

It is a further object of the present invention to provide timing circuitry for use with an infrared optical card reader.

In accordance with the present invention, an apparatus for determining whether portions of an identification badge are relatively opaque or transparent to infrared radiation upon movement of the badge relative to the apparatus includes a source of infrared radiation, a detector of infrared radiation and an alignment device for detecting the alignment of the relatively opaque or transparent portions of the badge with the source and detector and for producing an alignment signal upon such alignment. Activating means are provided for activating the source to produce a pulse of infrared radiation in response to a signal related to the alignment signal. The detector thereby provides an output in response to the pulse only when the portion of the badge is relatively transparent.

In accordance with a specific embodiment of the invention, the above described apparatus may further include a first one-shot device receiving the alignment signal for providing the signal related to the alignment signal to the activating device, the related signal having a first predetermined pulse width. The activating device may include means for applying a voltage to the source in the presence of the related signal. The source is preferably an infrared emitting diode, and the detector an infrared sensitive phototransistor and a voltage level detector for detecting the level of the output of the phototransistor. The alignment device may include a LED, a phototransistor which receives a signal from the LED upon the above-mentioned alignment, and another voltage level detector for detecting the voltage level of the output of the phototransistor in the alignment device. The voltage level detectors may comprise Schmitt triggers.

Further, the above described apparatus may also include a data strobe circuit responsive to the alignment signal for producing a data strobe signal having a predetermined pulse width smaller than the pulse width of the relates signal during a portion of the related signal. More specifically, the data strobe pulse width may be approximately 25% of the related signal pulse width and produced approximately during the last quarter of the related signal. The data strobe circuit may include second and third one-shot devices, one of which is positive edge-triggered, the other of which is negative edge-triggered.

In accordance with preferred embodiments of the present invention, the relatively transparent portions of the badge are defined as those having an infrared transmissivity of at least 2% and the relatively opaque portions are defined as those having an infrared transmissivity of not more than 0.05%. Further, (i) the width of the related signal, (ii) the current provided to the source when the source is activated, (iii) the current through the detector when the detector detects infrared radiation (iv) the transmissivity of the relatively transparent portions to infrared radiation are selected so as to provide a predetermined reaction time in which the apparatus can discriminate between the relatively transparent and opaque portions.

BRIEF DESCRIPTION OF THE DRAWINGS

These and other objects, aspects and embodiments of the invention will be more fully described with reference to the following drawing figures of which:

FIG. 1 is a schematic diagram illustrating the infrared diode pulse generating and timing circuitry in accordance with the present invention;

FIG. 2 is an illustration of the badge utilized in conjunction with the present invention showing the layout of the relatively transparent and opaque portions of the badge;

FIGS. 3 and 4 are waveform diagrams illustrating the timing of the various portions of the circuit illustrated in FIG. 1;

DETAILED DESCRIPTION OF THE PREFERRED EMBODIMENTS

Figure 5:
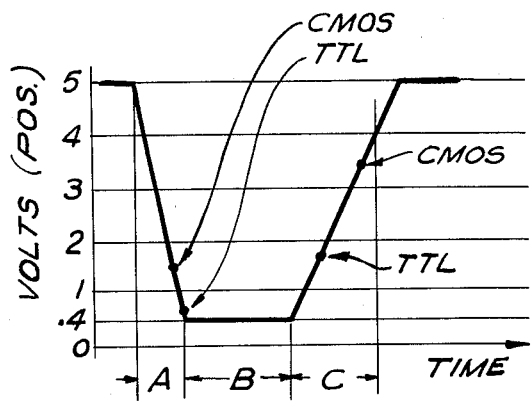
FIG. 5 is a graph illustrating in detail the characteristics of the phototransistor employed in the sensing circuitry in accordance with the present invention.

FIG. 1 illustrates the circuitry in accordance with the present invention. This circuitry is adapted to be utilized in conjunction with the optical badge reader described in the above-mentioned U.S. Pat. No. 4,114,028, or that described in copending U.S. Patent Application Ser. No. 356,046 filed Mar. 8, 1982 by Berezowski et al, and assigned to the assignee of the present invention, the entire disclosure of which is hereby incorporated by reference.

In FIG. 1, LED 14 and phototransistor Q1 respectively correspond to LED 32 and sensor 52, FIG. 2 of the above-mentioned U.S. Pat. No. 4,114,028. As more fully described in the latter patent, the phototransistor Q1 will produce a signal indicating that a column of data slots is aligned with the data sensors, thus designating the time at which the data sensors should be read to determine the data content of a particular column on the badge. In accordance with the present invention, this same signal is utilized to periodically activate infrared emitting diodes (IRED), to provide infrared radiation for transmission through an infrared coded badge.

One such infrared badge which may be used in conjunction with the present invention is illustrated in FIG. 2. Badge 10 is configured in a manner similar to that of badge 4 in the above-mentioned patent, namely with a generally rectangular configuration having one corner thereof cut. Rather than the Hollerith code being provided through the use of slots through the card, the badge in accordance with the present invention is provided with a pattern of materials which selectively passes infrared radiation therethrough or absorbs such infrared radiation. By detecting the patterns of such infrared transmission or lack thereof, individual cards 10 may be provided with unique identification codes.

By taking advantage of standard badge materials, such as mylar, polyethylene, terephthalate and polyvinyl chloride to pass infrared light to a greater extent than visible light, it is possible to construct a badge which contains data blocks 12 in a pattern of rows and columns which provides a unique identification code, yet which is completely opaque to visible light throughout the entire surface of the card. In this manner, the use of such cards provides a highly secure means of providing coded information on the badge which may be "read" by the circuitry of the present invention, yet which cannot be determined by unauthorized persons as in the case of the punched card type badges employed in the prior art.

The actual structure and composition of the badge described above does not constitute a part of the present invention. However, construction of the badge may be provided through the use of silk screening or printing of a black ink or paint which is substantially opaque to infrared (IR) light on a transparent plastic base in a predetermined pattern or code. The plastic base containing the code may then be laminated between layers of plastic material which are opaque to visible light, but transmissive to IR light of approximately 930 nm wave length. The materials selected must have both the quality of high IR absorption and readily lend themselves to lamination.

Ordinarily, IR transmission through the "transparent" portions of such badges is less than 2%. That is, approximately 0.2% of the incident IR radiation passes through the transparent parts of the badge made of the materials described above. Unfortunately, 0.2% of the amount of light normally available on a continuous basis from an IRED cannot be detected on a reliable basis. Thus, the present invention employs a pulsed technique wherein the IRED's are pulsed at current levels of up to ten times the rating of the devices, at a duty cycle low enough so as to provide an average power dissipation well within the rating of the device. By detecting the existence of IR radiation only during such pulsing periods, a reliable determination can be made as to the existence or non-existence of such IR radiation.

Through the use of high output pulsed IRED's and sensitive phototransistors, the IRED/phototransistor pairs will actually "see" through the standard badge materials, except for those areas coated with IR absorbing materials. The card which is used in conjunction with the present invention will be typically adapted to provide a minimum of 2% IR transmission where no IR absorbing coating is provided, and not more than 0.05% transmission where the IR absorbing coating is provided.

Returning to FIG. 1, the anode of LED 14, associated with the strobe generating circuitry of the above-mentioned patent, is connected to the positive supply voltage, typically 5 volts DC, via resistor R1. The detecting phototransistor Q1 associated with the strobe generating circuitry has its collector applied to the supply voltage via resistor R2, the emitter of transistor Q1 and the cathode of diode 14 being applied directly to ground. The strobe output taken from the collector of transistor Q1 is applied to the input of inverting Schmitt trigger 16 which may be of the type generally designated 74C14. The inverted output from Schmitt trigger 16 is applied to a pair of positive-edge triggered one-shot devices 18 and 20, the output of one shot device 18 being applied to negative-edge triggered one-shot device 22. The output of one-shot device 20 is applied to IRED driver 24, such as a high gain power switching transistor, which functions to apply the control voltage VDC to the anodes of a plurality of IRED's, via an associated resistor R3, each IRED being provided for an individual row of data, but only one of which, 26, is shown. The cathode of diode 26 is applied directly to ground. When so supplied with the supply voltage, IRED 26 functions to transmit infrared radiation, some of which may pass through badge 10 to phototransistor Q2 depending upon whether an IR absorbing material is interposed therebetween. The collector of phototransistor Q2 is applied to the supply voltage VDC by way of resistor R4, while the emitter thereof is applied directly to ground. The output of phototransistor Q2, taken directly from the collector thereof, is applied to the input of an inverting Schmitt trigger 28, of the type such as the 74C14 or the 74LS14. The output of Schmitt trigger 28 provides either a positive voltage level or zero voltage level, respectively, indicating the presence or absence of the IR absorbing material at the particular location on badge 10. As in the case of the light sensors 51 in FIG. 2 of U.S. Pat. No. 4,114,028, an individual IRED/phototransistor pair 26/Q2 is provided for each of the rows of data to be read. In this manner, the data on the badge is read in parallel form from a plurality of Schmitt triggers such as Schmitt trigger 28, FIG. 1.

The operation of the circuit shown in FIG. 1 will be described with further reference to FIGS. 3 and 4. Upon insertion of the badge into the optical badge reader, the badge causes the strobe generator within the reader to move such that one of the plurality of slots 15a in the strobe generator 15 becomes aligned with strobe LED 14 and strobe phototransistor Q1 when the badge has reached a predetermined position corresponding to the alignment of a column of data on the badge with the sensing phototransistors Q2. At such moment of alignment, phototransistor Q1 conducts to thereby apply a low signal voltage to the input of inverting Schmitt trigger 16, thus providing a positive signal voltage A at time T1. The positive signal A causes one-shot device 20 to trigger to provide a positive signal B also substantially at time T1. The positive signal B is applied to IRED driver 24 which provides the supply voltage VDC to IRED 26 via resistor R3. In response thereto, IRED 26 emits IR radiation and, assuming that no IR absorbing material is interposed between IRED 26 and phototransistor Q2, phototransistor Q2 receives sufficient IR radiation to cause it to conduct to thereby draw its collector voltage toward ground to provide signal C as shown in FIG. 3. At time T2 the trigger voltage of inverting Schmitt trigger 28 is attained to thereby provide positive signal D indicative of the absence of the IR absorbing material on the particular location of badge 10.

Signal A is also applied to one-shot 18 which, in response thereto, provides a high signal level having a duty cycle of approximately 75% of that of one-shot 20. When one-shot 18 returns to a low signal voltage, negative-edge triggered one-shot 22 provides a positive going signal E, the duty cycle of one-shot 22 being approximately 25% of that of one-shot 20. Signal E thus provides a data strobe at time T3 during the last quarter of the period of signal B, during which time the data signal D is read, to thereby insure that the phototransistor Q2 has reached full saturation before the detection of the data occurs.

At time T4, the output of one-shot 20 goes low, thus removing the current supplied to all of the IRED's 26, thus causing signal C to increase in voltage as phototransistor Q2 turns off. At point T5, signal C attains a voltage sufficient to cause inverting Schmitt trigger 28 to produce a low voltage.

FIG. 4 illustrates the situation where one of the opaque portions of the badge is interposed between IRED 26 and phototransistor Q2. At time T1, a very small amount of IR radiation is received by phototransistor Q2 since all but 0.05% of the radiation is absorbed by the badge. Thus, signal C varies an amount which is insufficient to trigger Schmitt trigger 28, signal D thereby remaining at a low state indicative of the presence of the opaque portion of the card.

As mentioned above, the transmissivity characteristics of the infrared badge described above require a transmissivity of not less than 2% of the incident light for a "transparent" area of the badge, and not more than 0.05% transmission for an area of the badge which blocks the light. Due to the inherently low signal levels encountered in such apparatus, the operating points of the detection circuitry in accordance with the present invention must be wisely selected.

For example, in FIG. 5, a detailed illustration of waveform C is provided. It can be seen that the amount of time A required to cause phototransistor Q2 to switch from an off state to a saturated state, and the amount of time C required for phototransistor Q2 to recover from the saturated state to positive 4 volts, are limiting factors in the speed at which the badge may be inserted into the machine. If the times A and C are excessive, the badge reader will only function properly for slow insertion speeds. A 50 mS card insertion time is desired for typical applications, leading to approximately 2 mS read time per data column. The amount of time B at which phototransistor Q2 is saturated is also shown in FIG. 5, as are the positive and negative trigger points for the 74C14 CMOS or 74LS14 TTL Schmitt trigger 28, FIG. 1.

Examples of operating specifications for the FIG. 1 circuitry will now be discussed with further reference to FIGS. 6 through 13. In the first example, the drive current provided through IRED 26 is approximately 400 mA, the duration of the pulse (signal B) provided by IRED driver 24 to IRED 26 is approximately 400 $\mu$S, and the approximate transmission through a transparent portion of badge is at least 2%.

Figure 6:
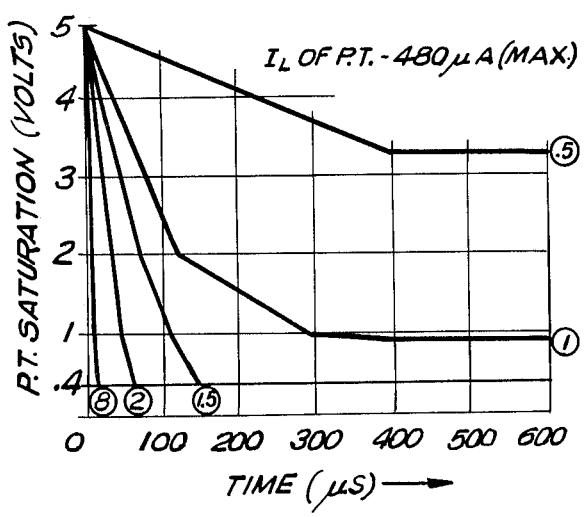
FIG. 6 is a graph illustrating the saturation voltage of the phototransistor as a function of time and transmissivity of the infrared coded badge for an infrared diode drive current of 400 mA, an infrared diode drive pulse of 400 $\mu$S, and a phototransistor current of 480 $\mu$A.
Figure 7:
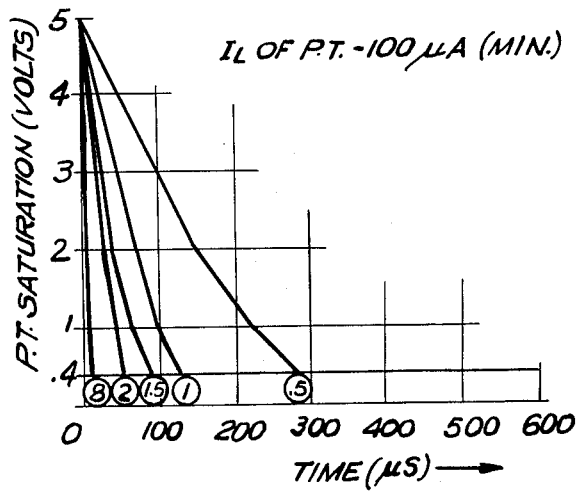
FIG. 7 is a graph illustrating the saturation voltage of the phototransistor as a function of time and transmissivity of the infrared coded badge for an infrared diode drive current of 400 mA, an infrared diode drive pulse of 400 $\mu$S, and a phototransistor current of 100 $\mu$A.

FIGS. 6 and 7 illustrate the time required for phototransistor Q2 to attain a saturated state as a function of time and card transmissivity, for a collector-emitter current ($I_L$) through phototransistor Q1 of 480 $\mu$A and 100 $\mu$A, respectively. Values are shown in FIGS. 6 and 7 for transmissivities of 8,2, 1.5, 1.0 and 0.5%. However, values less than 2% are shown for reference purposes only and should not be used in an actual system. From the above stated conditions, it can be seen from FIG. 6 that phototransistor Q2 requires approximately 60 $\mu$S to go from 5 volts to 0.4 volts for an $I_L$ of 480 $\mu$A. Transistor Q2 remains at saturation for approximately 340 $\mu$S until the drive signal B applied to the IRED driver 24 is terminated. The saturation time is slightly reduced to about 50 $\mu$S for an $I_L$ of 100 $\mu$A, as shown in FIG. 7.

Figure 8:
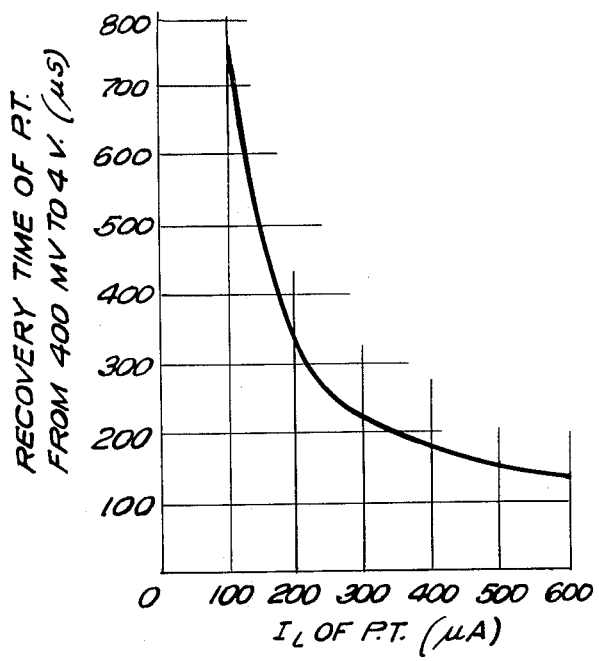
FIG. 8 is a graph illustrating the variation of recovery time of the phototransistor as a function of the current through the phototransistor.

FIG. 8 illustrates the recovery time of phototransistor Q2 from 0.4 volts to approximately 4 volts as a function of photoresistor current $I_L$. For the above-stated conditions, the recovery time for the phototransistor Q2 based on a phototransistor current $I_L$ of 480 $\mu$A is approximately 160 $\mu$S.

Thus for the conditions stated, with a saturation time of approximately 60 $\mu$S, Schmitt trigger 28 is assured of changing state within the 400 $\mu$S pulse B applied to IRED driver 24, and since the recovery time of 160 µS is well within the maximum value of 2 mS read time per data column, allowing an insertion speed faster than 50 mS, such operating conditions would result in a satisfactory circuit operation.

Figure 9:
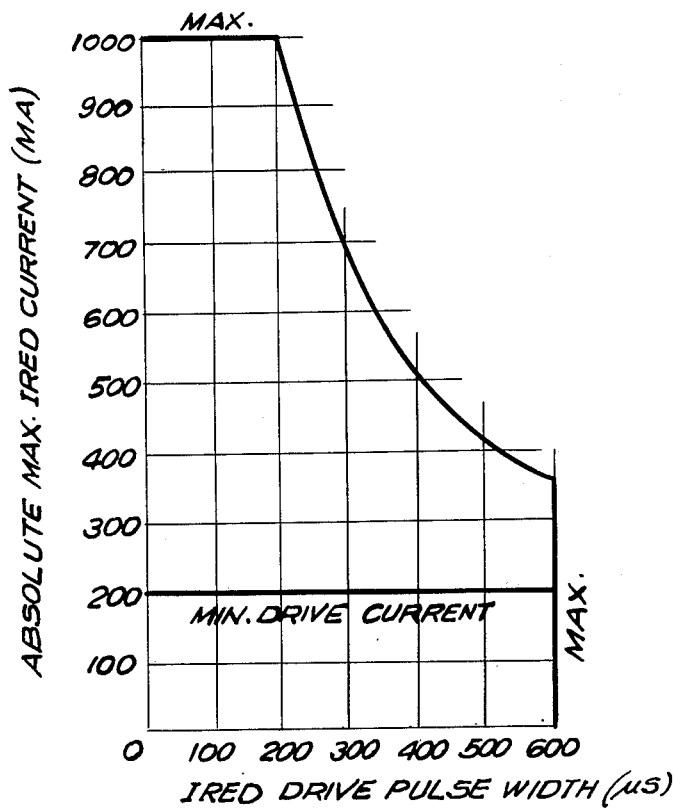
FIG. 9 is a graph illustrating the absolute maximum current through the infrared light emitting diode as a function of the width of the drive pulse therefor.

However, other operating conditions could possibly exist which would effect the above-described operating points. Assuming, for example, that the capacity of the DC supply limits the amount of drive current available to IRED 26, suitable changes to the operating points of the circuitry will have to be made. FIG. 9 illustrates the maximum current which may be applied to IRED 26 as a function of the pulse width of the signal B applied to the IRED driver 24 for a pulse once every 2 mS at 25° C. As shown in FIG. 9, a practical maximum value for current through IRED 26 is 100 mA, while the maximum pulse width of signal B is 600 µS. The minimum drive current applied to IRED 26 should be approximately 200 mA.

Figure 10:
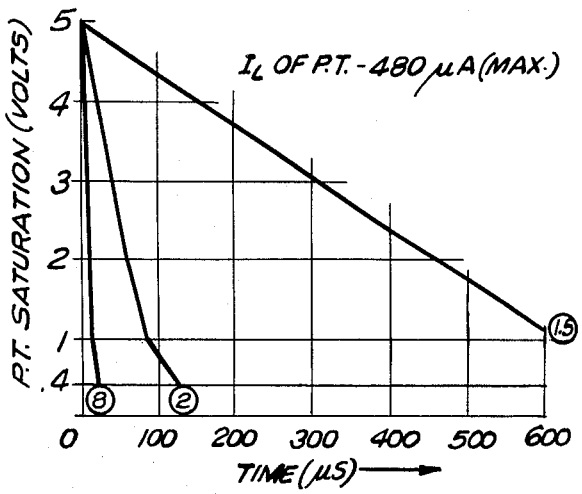
FIG. 10 is a graph illustrating the saturation voltage of the phototransistor as a function of time and transmissivity of the infrared code on the badge for a phototransistor current of 480 μA, and infrared emitting diode current of 200 mA and an infrared emitting diode pulse width of 600 μS.
Figure 11:
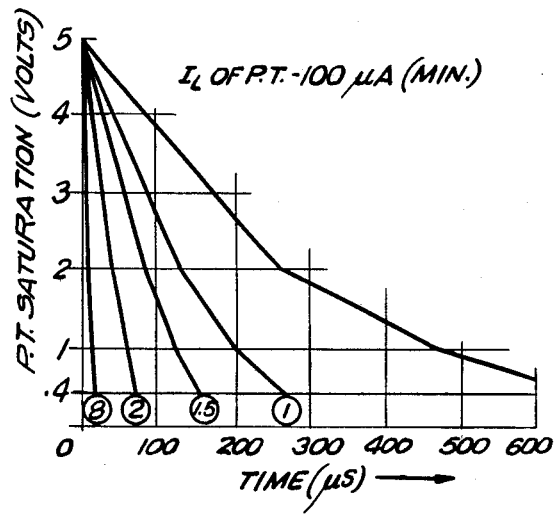
FIG. 11 is a graph illustrating the saturation voltage of the phototransistor vs. time and transmissivity of the infrared coded badge for a phototransistor current of 100 μA, and infrared emitting diode current of 200 mA and an infrared emitting diode pulse width of 600 μS.

With further reference to FIGS. 10 and 11, the time for phototransistor Q2 to attain a saturated state from 5 volts as a function of time and transmissivity of the badge are illustrated for an IRED supply current of 200 mA and an IRED drive pulse width of 600 µS, for a collector-emitter current through phototransistor Q2 of 480 µA, and 100 µA, respectively. The phototransistor current $I_L$ can be selected to attain a minimum saturation time from FIGS. 10 and 11. The reliability of the 480 µA operating point shown in FIG. 10 is marginal since there is a large variation of saturation time as the transmissivity of the card varies. Thus, as a smaller $I_L$ close to 100 µA is selected as shown in FIG. 10, the phototransistor Q2 will attain saturation at approximately 80 µS for a transmissivity of 2% and stay at saturation for approximately 520 µS (the 600 µS pulse with minus the 80 µS saturation time), with less variation with transmissivity. The recovery time of phototransistor Q2 for such operating condition should then be inspected to insure that the read cycle does not exceed the 2 mS per data column, reflecting an approximate insertion speed of 50 µS for a 22 column badge.

If a faster badge insertion speed is required, then a narrower IRED drive pulse B will be required to reliably read the data. By referring to FIG. 9, it can be seen that a drive pulse width of 200 µS at an IRED drive current of 800 mA would provide satisfactory operation.

Figure 12:
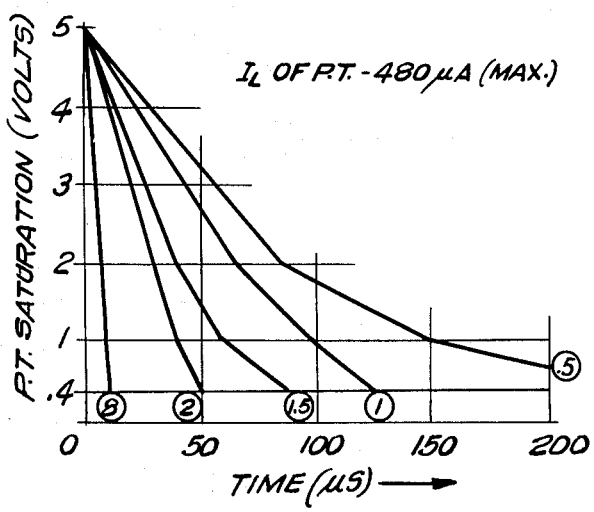
FIG. 12 is a graph illustrating the saturation voltage of the phototransistor as a function of time and transmissivity of the infrared coded badge for a phototransistor current of 480 μA, and infrared emitting diode drive current of 800 mA and an infrared emitting diode width of 200 μS.
Figure 13:
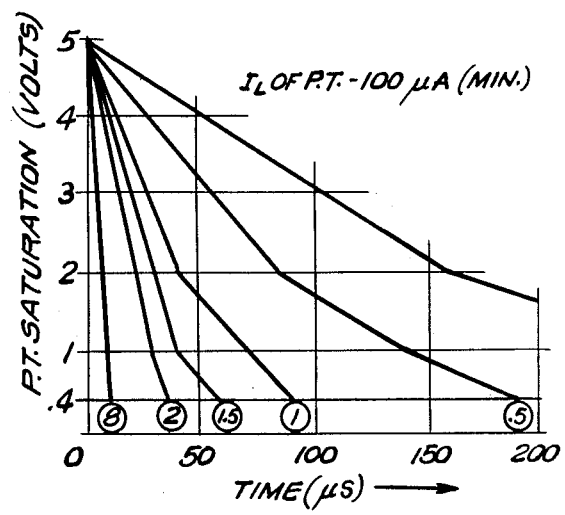
FIG. 13 is a graph illustrating the saturation voltage of the phototransistor as a function of time and transmissivity of the infrared coded badge for a phototransistor current of 100 μA, and infrared emitting diode drive current of 800 mA and an infrared emitting diode pulse width of 200 μS.

This invention is shown in FIGS. 12 and 13. For 2% transmissivity, a transistor current $I_L$ of either 480 µA or 100 µA will cause the transistor to saturate in less than 50 µS. However, with a transistor current $I_L$ of 100 µA, the recovery time, as determined from FIG. 7 of approximately 750 µS, might prevent the system from resolving data at very fast insertion speeds. Therefore, an $I_L$ of 480 µA should be selected in order to resolve data at the absolute fastest badge insertion speed.

Thus, the present invention provides a technique for accurately and reliably reading an infrared coded badge to thereby provide a highly secure identification system. Many different combinations of the above-described operating parameters to effect a wide variety of operating conditions will be apparent to those skilled in the art.

Although the specific examples and embodiments of the invention have been described with reference to the foregoing specification and drawings, the scope of the invention will now be defined with reference to the following claims.

What is claimed is:

1. Apparatus for determining whether portions of an identification badge are relatively opaque or transparent to infrared radiation upon movement of said badge relative to said apparatus comprising:
   identification means on said badge including relatively transparent portions having an infrared transmissivity of at least 2% for passing infrared radiation incident thereon, and relatively opaque portions having infrared transmissivity of not more than 0.05%;
   a source of infrared radiation;
   detector means for sensing infrared radiation and producing an output signal in response thereto;
   alignment means for detecting the alignment of said relatively opaque or transparent portions of said badge with said source and detector means and for producing an alignment signal upon the occurrence of a predetermined alignment;
   activating means for activating said source to produce a pulse of infrared radiation having a first pulse width in response to the production of an alignment signal, which radiation is sensed by said detector means when a relatively transparent portion of said badge is aligned therewith;
   means for receiving output signals from said detector means and producing an indication signal in response thereto;
   means for utilizing said indication signal in response to a readout signal; and
   data strobe means for receiving said alignment signal and producing said readout signal in response thereto, said readout signal having a second pulse width approximately one-quarter of that of said first pulse width and being timed to occur substantially during the last quarter of said pulse of infrared radiation, whereby the indication signal is utilized during said last quarter.

2. The apparatus of claim 1 wherein said activating means comprises:
   driver means for applying a voltage to said source; and a first one-shot device for receiving said alignment signal and providing an activating signal in said driver means, the width of said alignment signal being equal to that of said first pulse width of radiation.

3. The apparatus of claim 1 wherein said source is an infrared emitting diode.

4. The apparatus of claim 1 wherein said detector means comprises an infrared sensitive phototransistor and said indication signal producing means comprises means for detecting the voltage level of the output signals from said phototransistor.

5. The apparatus of claim 1 wherein said alignment means comprises an LED, a phototransistor which receives a signal from said LED, and means for detecting the voltage level of the output of said phototransistor.

6. The apparatus of claims 4 or 5 wherein said means for detecting the voltage level comprises a Schmitt trigger.

7. The apparatus of claim 1 wherein said data strobe means comprise second and third one-shot devices, one of which is positive-edge triggered, the other of which is negative-edge triggered.

8. The apparatus of claim 1 wherein (i) the width of said related signal, (ii) the current provided to the source when said source is activated, (iii) the current through said detector when said detector detects infrared radiation, and (iv) the transmissivity of said relatively transparent portions to infrared radiation are selected so as to provide a predetermined reaction time in which said apparatus can discriminate between said relatively transparent and opaque portions.

* * * * *